(12) United States Patent
Vachon et al.

(10) Patent No.: US 6,769,077 B2
(45) Date of Patent: Jul. 27, 2004

(54) SYSTEM AND METHOD FOR REMOTELY CREATING A PHYSICAL MEMORY SNAPSHOT OVER A SERIAL BUS

(75) Inventors: Andre F. Vachon, Redmond, WA (US); Georgios Chrysanthakopoulos, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 09/742,975

(22) Filed: Dec. 20, 2000

(65) Prior Publication Data

US 2002/0078404 A1 Jun. 20, 2002

(51) Int. Cl.[7] ............................................... G06F 11/00
(52) U.S. Cl. ......................................................... 714/43
(58) Field of Search ............................. 714/15, 38, 42

(56) References Cited

U.S. PATENT DOCUMENTS

| | | | | |
|---|---|---|---|---|
| 5,101,494 A | * | 3/1992 | Bilski et al. ................ | 717/127 |
| 5,111,384 A | * | 5/1992 | Aslanian et al. ............. | 714/26 |
| 5,999,933 A | * | 12/1999 | Mehta ........................ | 707/100 |
| 6,094,530 A | * | 7/2000 | Brandewie .................. | 717/127 |
| 6,226,761 B1 | * | 5/2001 | Berstis ........................ | 714/37 |
| 6,401,216 B1 | * | 6/2002 | Meth et al. .................. | 714/16 |
| 6,430,707 B1 | * | 8/2002 | Matthews et al. ............ | 714/37 |
| 6,480,972 B1 | * | 11/2002 | Cromer et al. ............... | 714/25 |

* cited by examiner

Primary Examiner—Robert Beausoliel
Assistant Examiner—Bryce P. Bonzo
(74) Attorney, Agent, or Firm—Banner & Witcoff, Ltd.

(57) ABSTRACT

A two-computer crash dump scenario in which a snapshot of the physical memory of a target computer is extracted and stored by a host computer over an IEEE 1394 compliant serial bus is provided. A host computer debugger remotely stops execution of the core operating system of the target computer. Handshake information is then provided from the target computer core operating system to the host computer debugger. The handshake information specifies, among other information, one or more address ranges at which physical memory is present on the target computer. The host computer debugger then directly accesses the physical memory of the target computer system over the IEEE 1394 bus in accordance with the handshake information. The host computer then stores the contents of the physical memory of the target computer system. Execution of the core operating system of the target system can then be resumed, and the core operating system of the target computer can be debugged in parallel with the resumed execution of the target computer core operating system.

20 Claims, 7 Drawing Sheets

SYSTEM AND METHOD FOR REMOTELY CREATING A PHYSICAL MEMORY SNAPSHOT OVER A SERIAL BUS

TECHNICAL FIELD

The present invention relates generally to storing information for use in debugging computer software. More particularly, the invention provides a method and apparatus for using a serial bus, such as an IEEE 1394 bus, to remotely create, from a host computer, a snapshot of physical memory of a target computer.

BACKGROUND OF THE INVENTION

Many operating systems support "crash dumps" or "core dumps." These are typically files that an operating system generates when the operating system recognizes an internal failure. Operating systems typically switch to a minimal mode of operation and attempt to save the operating system's state information to a file on disk. A software developer or system administrator can subsequently use the saved state information to analyze the operating system failure. Such analysis is often referred to as "debugging."

Figure 2:
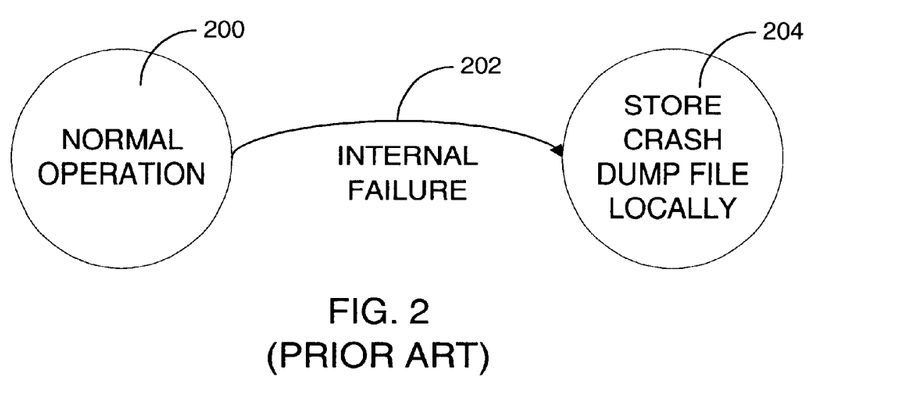
FIG. 2 is a simplified state diagram showing a conventional single computer crash dump scenario.

Typically, a crash dump file is generated by the operating system and stored on a disk drive that is local to the computer on which the internal failure occurred. FIG. 2 is a simplified state diagram showing that upon the occurrence of an internal failure, a state transition 202 occurs from normal operation state 200 to minimal mode of operation state 204 in which a crash dump file is stored locally, for instance on a local hard disk.

Unfortunately, upon the occurrence of an internal failure, for various reasons the operating system may not be able to store the crash dump file locally. For instance, there may be insufficient local storage space available or the target computer's local hard drive might be off line.

Under such circumstance, it is typically desirable to retrieve the crash dump remotely and store it on a remote computer the moment the target computer crashes. Due to the relatively slow rate at which conventional serial buses transfer data, however, transferring the contents of physical memory of a target computer, for instance 64 megabytes of memory, would take a prohibitively long time.

Accordingly, there is a need for improved techniques for creating a crash dump file much more quickly, while minimizing the amount of operating system state information that is corrupted or otherwise lost, and under circumstances in which a crash dump file cannot be stored on a local drive of the computer that has experienced an internal fault.

Figure 3:
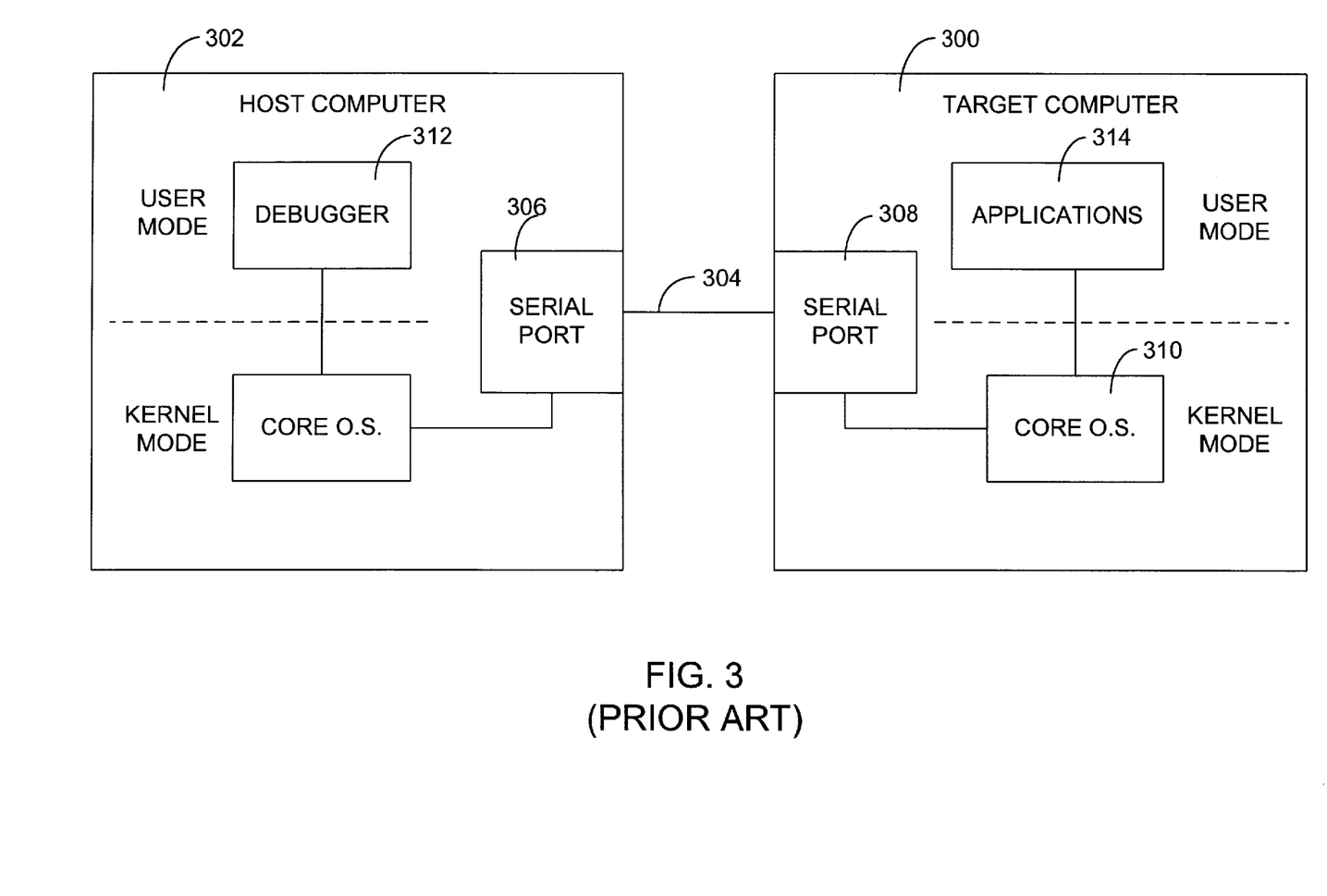
FIG. 3 is a schematic block diagram of a system employing conventional techniques for performing real-time remote kernel debugging.

Referring to FIG. 3, techniques for remote debugging of the kernel of an operating system and application programs of a first computer, such as target computer 300, from a second computer, such as host computer 302 are known in the art. In such an environment, a hardware link 304 (e.g., RS-232C), such as a serial connection, is used to transmit debugging commands to and return debugging results from software undergoing test on target computer 300, via serial ports 306 and 308. A small portion of core operating system ("O.S.") 310, typically "pushes" data to host debugger 312, thus using processor time on target computer 300 and causing side effects on target computer 300 that would not occur absent debugging-related operation of this small portion of core O.S. code.

Kernel debugging presents technical problems different than those presented by debugging application programs 314, which typically run in user mode. For instance, core operating system 310 typically must be halted for kernel debugging, but core operating system 310 typically is not halted for debugging of user mode application programs.

Figure 4:
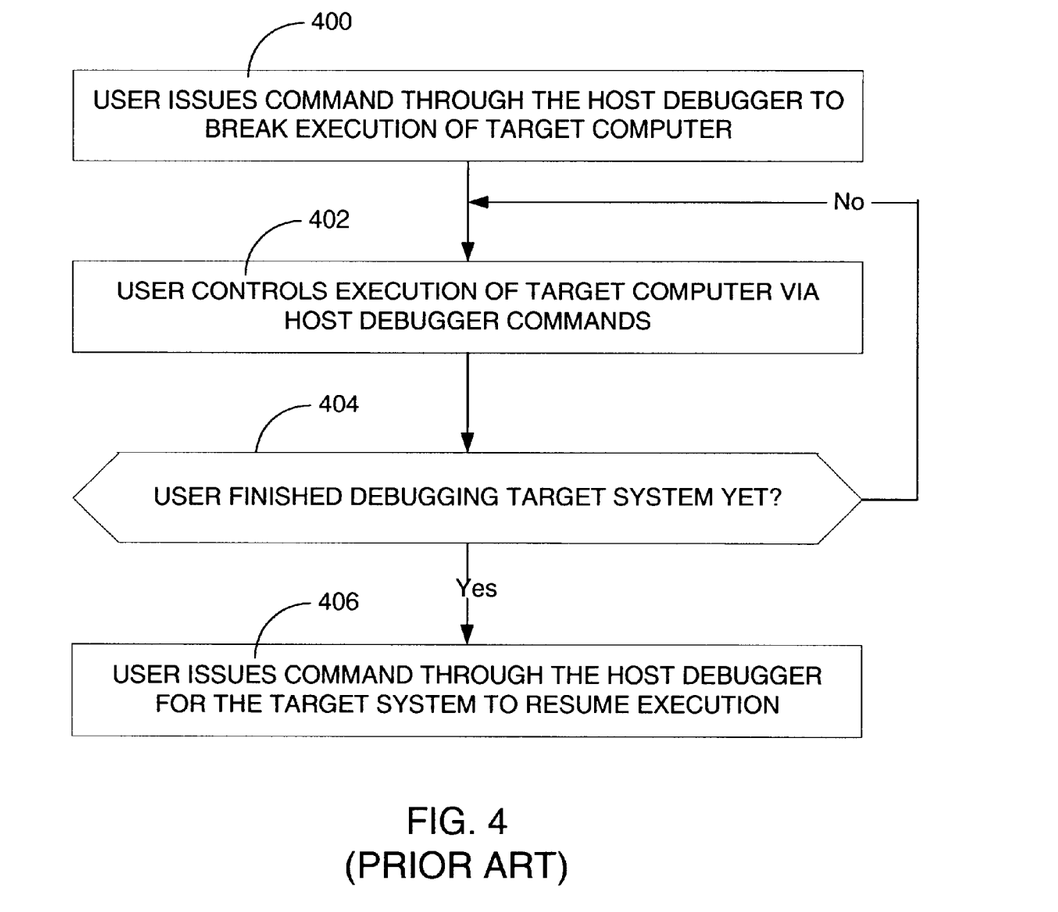
FIG. 4 shows steps of a conventional technique for performing real-time remote kernel debugging.

FIG. 4 is a flow chart of simplified steps for conventional remote debugging of core operating system 310, which typically runs in kernel mode. At step 400, a user, such as a system administrator, issues a command through host debugger 312 to break execution, in other words stop, suspend, or halt, execution of target computer 300. At step 402, the system administrator may issue well-known debugging commands to step through portions of code, set the contents of target computer memory locations to specific values, and the like. Debugging in this manner is often a very time-consuming process. At step 404, a determination is made regarding whether the system administrator is finished debugging the core operating system 310 of target computer 300. Steps 402 and 404 continue in a loop until the system administrator is finished remotely debugging the kernel of target system 300, at which point host computer debugger 312 releases control of core O.S. 310, which may resume executing, as indicated at step 406.

A significant disadvantage of conventional remote kernel debugging in accordance with FIGS. 3 and 4 is that target computer 300 is not operating while the kernel is being remotely debugged. Because debugging is often necessary for certain types of software issues, such as memory leaks, application hangs, and many other non-fatal crashes, and because debugging is typically very time-consuming, there is a need for improved remote kernel debugging techniques that allow debugging to be performed in parallel with operation of a target computer.

SUMMARY OF THE INVENTION

A system and method in accordance with certain inventive principles overcomes the foregoing shortcomings of conventional generation of crash dump files and remote kernel debugging. In accordance with principles of the invention, a two-computer crash dump scenario is provided in which a snapshot of the physical memory of a target computer is extracted and stored by a host computer over a serial bus, which may be IEEE 1394 compliant. In this manner, a crash dump can be transferred quickly and under circumstances in which a conventional single computer crash dump may not be feasible.

A host computer debugger may remotely issue a command to stop execution of the core operating system of the target computer. Handshake information is then preferably provided from the target computer core operating system to the host computer debugger. The handshake information preferably specifies, among other information, one or more address ranges at which physical memory is present on the target computer, as disclosed in the commonly assigned patent application entitled "Method and Apparatus for Remotely Debugging Computer Software Over a Serial Bus," application Ser. No. 09/488,015, filed Jan. 20, 2000, which is incorporated herein by reference.

The host computer debugger then preferably directly accesses the physical memory of the target computer system over the serial bus in accordance with the handshake information. The host computer then stores the contents of the physical memory of the target computer system.

Execution of the core operating system of the target system may then be resumed, and the core operating system of the target computer may be debugged in parallel with resumed execution of the target computer core operating system. In this manner, the amount of time that the target system computer is not operational due to debugging is significantly reduced relative to debugging the core operating system of the target computer in real time.

Additional features and advantages of the invention will be apparent upon reviewing the following detailed description.

DETAILED DESCRIPTION OF THE INVENTION

Figure 1:
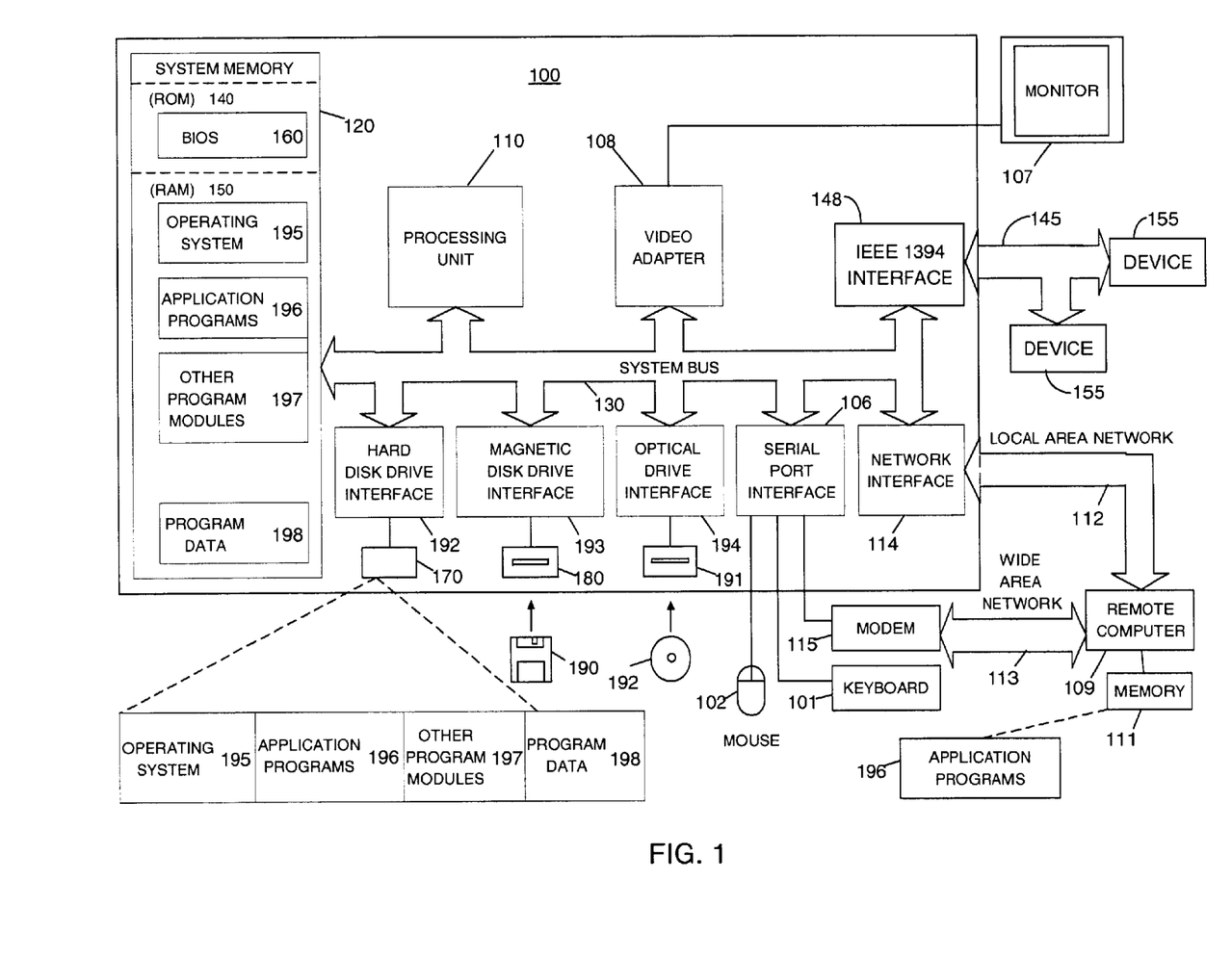
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An interface 148 that complies with IEEE 1394 or the like may also be provided. The interface 148 couples an IEEE 1394-compliant serial bus 145 or the like to the system bus 130 or similar communication bus. The IEEE 1394-compliant serial bus 145, as known in the art, allows multiple devices 155 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by reference. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 5:
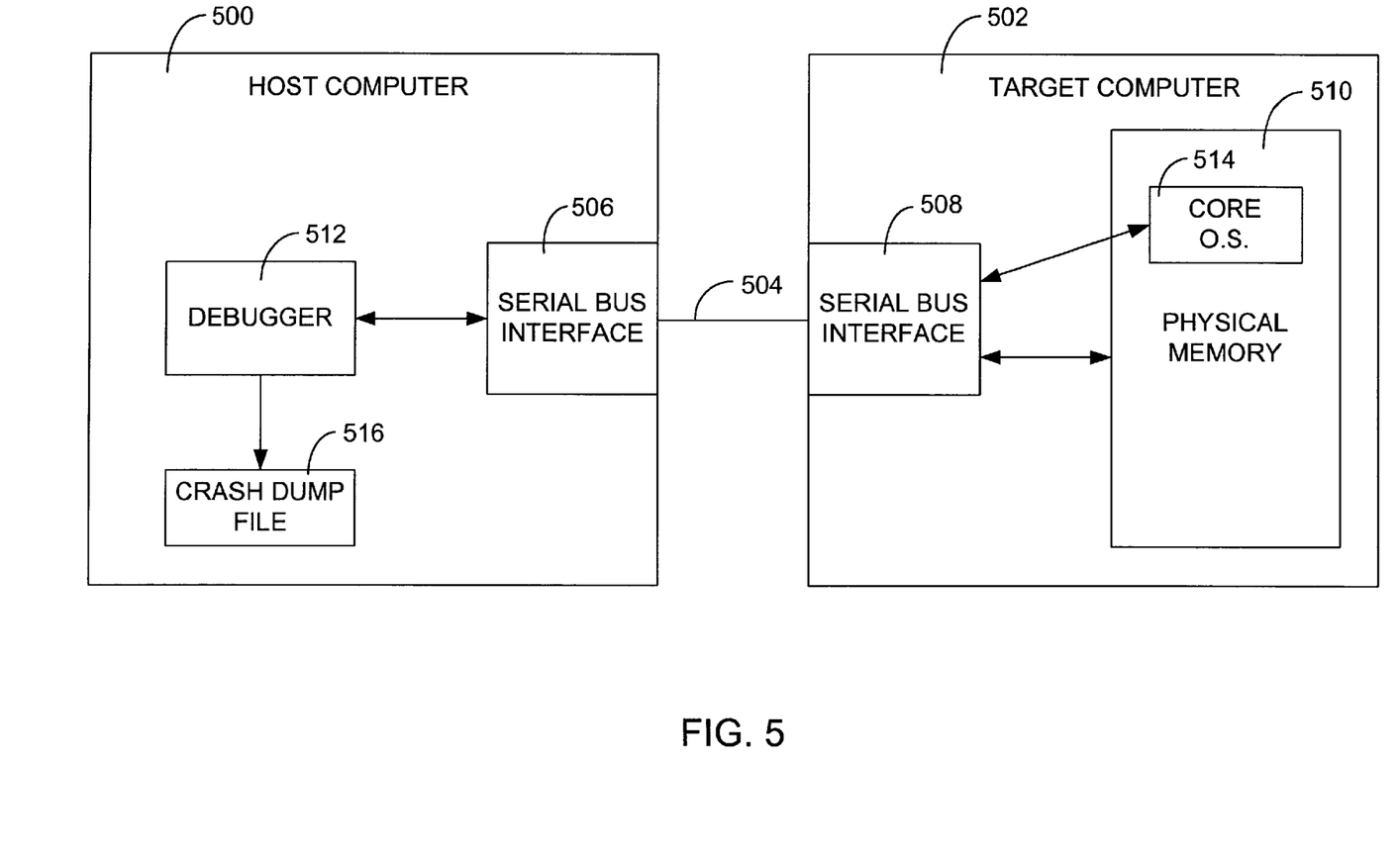
FIG. 5 is a schematic block diagram of a system employing various inventive principles for creating a snapshot of the physical memory of a target computer.

FIG. 5 depicts a simplified block diagram of an exemplary system for remotely creating a physical memory snapshot in accordance with various inventive principles. As shown in FIG. 5, a host computer 500 is coupled to target computer 502 through a serial bus 504. Serial bus 504 may comprise a bus adhering to the IEEE 1394 standard, as described in more detail in the commonly assigned patent application entitled "Method and Apparatus for Remotely Debugging Computer Software Over a Serial Bus," application Ser. No. 09/488,015, filed Jan. 20, 2000, which is incorporated herein by reference. Application Ser. No. 09/488,015 also describes in detail a mechanism for performing remote kernel debugging over an IEEE 1394 bus. That description will not be repeated herein.

According to an aspect of the invention, host computer 500 and target computer 502 both include a serial bus interface (elements 506 and 508) that allows each computer to transmit and receive commands and data on serial bus 504, such as an IEEE 1394 serial bus. According to an aspect of the invention, such cards may comprise commercially available interface cards that are internally compatible with the well-known PCI bus used by many personal computers. Use of the IEEE 1394 serial bus effectively presents the target computer's physical memory 510 as a linear address space that is addressable from the host computer 500. Accordingly, host computer 500, in accordance with various inventive principles, is able to record substantially all of the contents of the target computer's physical memory 510. Host computer 500 is, therefore, effectively able to create a snapshot of the state of the core operating system of target computer 502.

Figure 6:
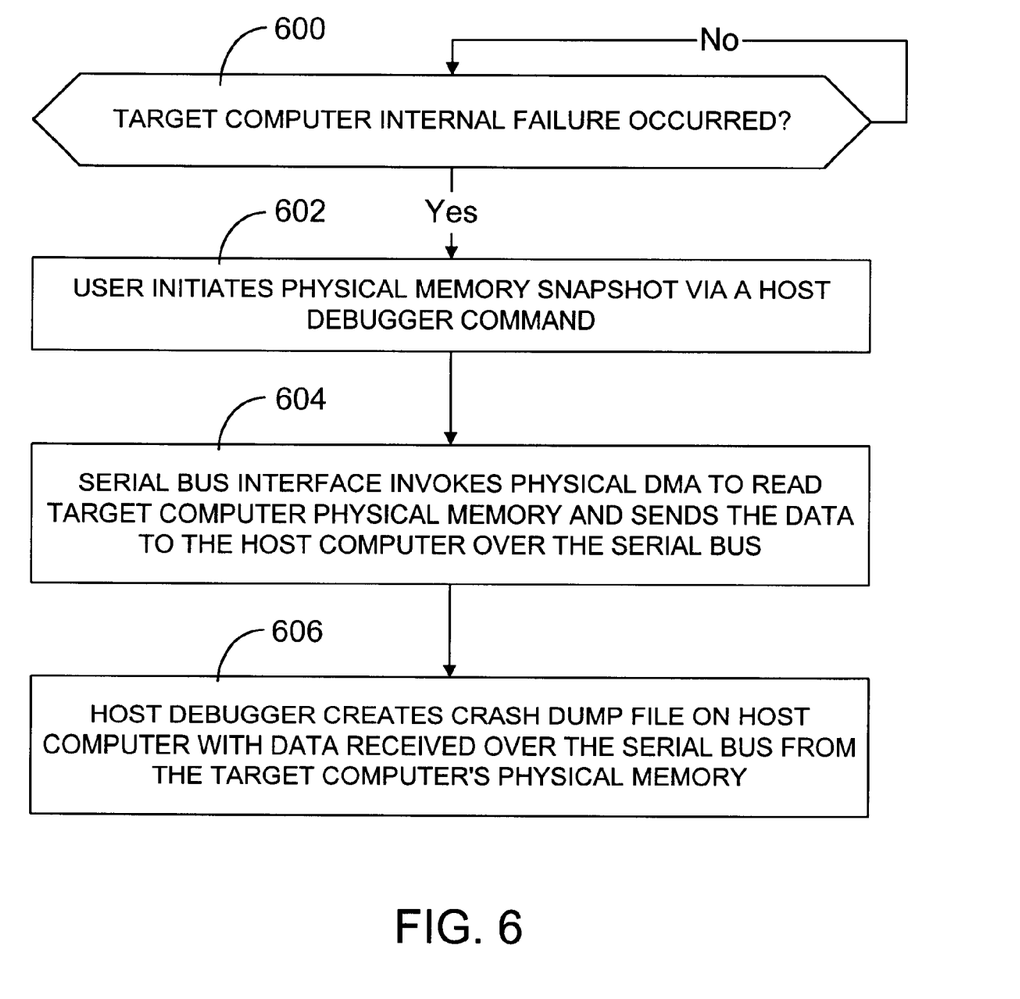
FIG. 6 shows steps in accordance with inventive principles for creating a snapshot of the physical memory of a target computer.

Referring to FIG. 6, simplified steps are shown for remotely creating a crash dump file in accordance with certain inventive principles. After a fault condition has been identified, as shown at step 600, a system administrator having a host computer 500 in the form of a lap top computer, for instance, can advantageously perform steps such as steps 602–606 to remotely create a crash dump file.

The system administrator may connect the lap top computer to the target computer and then extract the contents of the target computer's physical memory. The system administrator may then put the crash dump file on a server and multiple developers could use the crash dump file to debug the cause of the internal fault even under circumstances in which the crash dump file could not have been stored locally at the target computer.

As shown at step 602, upon the occurrence of an internal fault condition on target computer 502, a user, such as a system administrator, initiates a physical memory snapshot, for instance, by entering a command, such as ".dump" to host debugger 512. At step 604, serial bus interface 508, which according to an aspect of the invention may include an IEEE 1394 controller card, invokes physical Direct Memory Access (DMA) to read the contents of target computer physical memory 510. Serial bus interface 508 then sends the data to the host computer 500 over serial bus 504. At step 606, host debugger 512 creates the crash dump file on host computer and stores the data received over serial bus 504 from the target computer's physical memory 512 in the crash dump file 516.

In accordance with an aspect of the invention, use of an IEEE 1394 serial bus results in a very significant reduction in the amount of time required for transferring the entire physical memory of a target computer. For instance, over an IEEE 1394 bus, transferring 512 megabytes would take approximately 20 seconds. In sharp contrast, using a conventional serial link, transferring the same amount of data would take approximately two to three hours.

Figure 7:
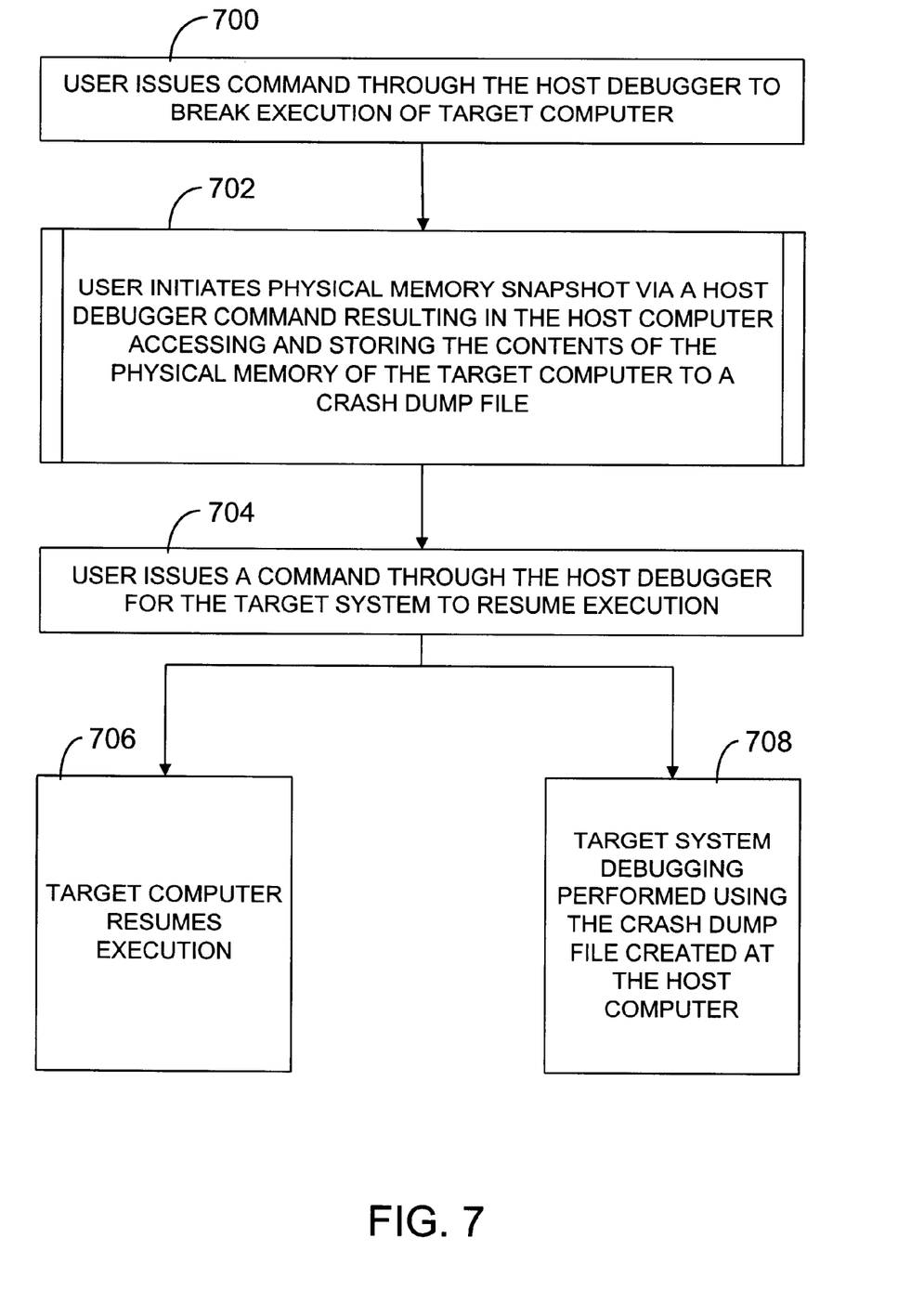
FIG. 7 shows steps in accordance with inventive principles for creating a snapshot of the physical memory of a target computer and for using the snapshot to perform kernel debugging in parallel with resumed execution of the kernel of the target computer.

Referring to FIG. 7, steps are shown for remotely creating a physical memory snapshot to enable kernel debugging with minimal down time in accordance with various inventive principles. At step 700, a user, such as a system administrator, may issue a command through host debugger 512 to halt normal execution of core operating system 514 of target computer 502. Halting execution of core operating system 514 is sometimes referred to as "breaking into" target computer 502. At step 702, the user initiates a physical memory snapshot, for instance, by entering a command such as ".dump," which results in host computer 500 accessing the contents of physical memory 510 of target computer 502 and storing the contents of physical memory 510 to a crash dump file 516 from host computer 500. Step 702 is described in more detail below with reference to FIG. 8. The double vertical lines shown in the box for 702 in FIG. 7 indicate that sub-steps of step 702 are depicted in more in a separate flowchart, which, in this case, is FIG. 8. At step 704, the user issues a command via host debugger 512 to instruct core operating system 514 of target computer 502 to resume execution. As indicated at steps 706 and 708, target computer 502 may be debugged using crash dump file 516 while the target computer is executing. This provides a significant advantage over conventional techniques that require real-time core operating system debugging by providing significantly less down time associated with debugging a target computer.

Figure 8:
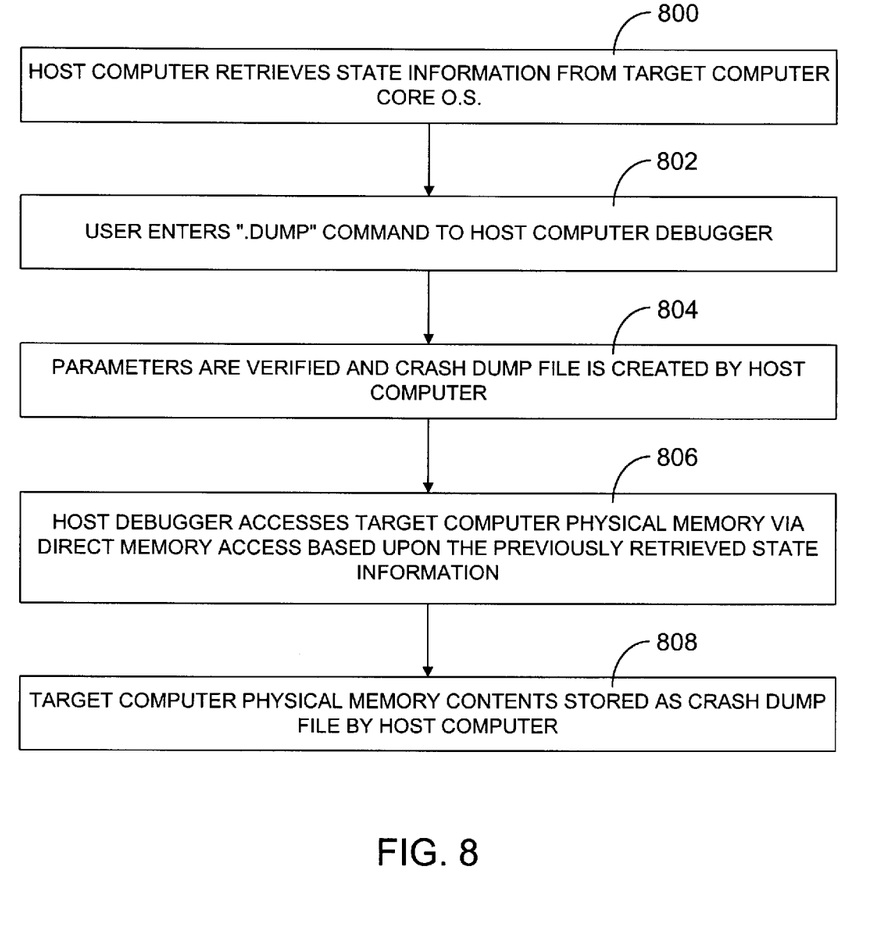
FIG. 8 shows in more detail the step in FIG. 7 of a user initiating a physical memory snapshot via a host debugger command.

FIG. 8 is a flow chart showing, in more detail, steps that may be performed as part of step 702 in FIG. 7. At step 800, host computer debugger 512 retrieves state information from core operating system 514. Step 800 is essentially a "handshake" procedure for extracting information stored in physical memory 510 of target computer 502. This handshake information allows debugger 512 to identify information about target computer 502 and core operating system 514 that may be useful for debugging core operating system 514. For instance, handshake information could include, but is not limited to, identifying information about the operating system, such as the operating system version, how much physical memory target computer 502 has, what portions of virtual memory are mapped to physical memory, and the like. Core operating system 514 preferably includes state information indicating one or more particular address ranges for which physical memory is present on target computer 502. Host debugger 512 preferably accesses this portion of the handshake information that indicates at which address ranges physical memory is present, as part of step 800. A pointer to the handshake information could be provided to host debugger 512, and host debugger could then directly access the handshake information over serial bus 504.

At steps 802 and 804, a user, such as a system administrator, issues a command, such as ".dump" to host debugger 512 to initiate a memory snapshot of physical memory 510; parameters, such as a name for crash dump file 516, may be verified; and crash dump file 516 is created. At step 806, host debugger 512 accesses target computer physical memory 510 based upon the previously retrieved state information via direct memory access over serial bus 504, which in accordance with an aspect of the invention, may be IEEE 1394 compliant. For instance, based upon the handshake information specifying one or more address ranges at which physical memory is present, the host debugger 512 will retrieve the contents of physical memory 510 from those address ranges. Preferably serial bus interface 508 invokes physical direct memory access ("DMA") engines that do not affect the contents of physical memory 510. When bus 504 is IEEE 1394 compliant, core operating system 514 and the processor of target computer 502 are not involved with transferring the contents of physical memory 510 over bus 504 in step 806, which, advantageously, preserves the state of core operating system 514 more accurately than conventional remote kernel debugging techniques.

At step 808, the retrieved contents of physical memory 510 are stored to crash dump file 516 by host computer 500. Although crash dump file 516 is depicted within host computer 500 in FIG. 5, crash dump file 516 may be stored on a networked server drive or any other suitable location. Crash dump file 516 is preferably a file having a header at the beginning of the file with some values that specify the format of the file. The header will typically be followed by pages of physical memory 510 starting from address 0 through to the end of physical memory 510.

What has been described above is merely illustrative of the application of the principles of the present invention. Those skilled in the art can implement other arrangements and methods without departing from the spirit and scope of the present invention. Any of the methods of the invention can be implemented in software that can be stored on computer disks or other computer-readable media for execution in a host or target computer. While an electrical medium has been described as the communications channel, the principles can also be applied using RF, fiber optic, or other media. No claim should be interpreted to be in means plus function format. Numbered steps in method claims should not be interpreted to require a particular ordering of the steps.

We claim:

1. A system for remotely creating a physical memory snapshot over a serial bus of a target computer core operating system stored at least in part in physical memory of the target computer, the system comprising:

a host computer including a debugger for
retrieving handshake information from the core operating system of the target computer,
directly accessing the physical memory of the target computer based upon the handshake information, and
storing a crash dump file containing the directly accessed physical memory of the target computer, wherein the host computer is configured to debug the core operating system of the target computer while the target computer core operating system is executing.

2. The system of claim 1 wherein the serial bus is IEEE 1394 compliant.

3. The system of claim 1 wherein the handshake information includes information specifying at least one address range for which the physical memory of the target computer is present.

4. The system of claim 3 wherein the information specifying at least one address range for which the physical memory of the target computer is present specifies substantially every location of the physical memory of the target computer.

5. The system of claim 4 wherein data stored in the physical memory of the target computer includes information sufficient for creating a simulated state of the core operating system as the core operating system existed immediately prior to accessing the physical memory of the target computer.

6. The system of claim 1 wherein the crash dump file is stored on a local drive of the host computer.

7. The system of claim 1 wherein the physical memory of the target computer appears to be linearly addressable by the host computer via the serial bus.

8. The system of claim 1 wherein the debugger sends a command over the serial bus to the target computer to halt execution of the target computer core operating system.

9. The system of claim 1 wherein a target computer serial bus interface performs direct memory access without altering the contents of the physical memory of the target computer.

10. A method of extracting and storing the contents of physical memory of a target computer, the method comprising:

obtaining handshake information from a target computer core operating system, the handshake information specifying at least one address range at which target computer physical memory exists;
directly accessing from a host computer the contents of the at least one address range at which target computer physical memory exists;
storing the contents of the at least one address range at which target computer physical memory exists to a storage device that is not local to the target computer; and
using the stored contents of the at least one address range at which target computer physical memory exists to debug the target computer core operating system while the target computer operating system is executing.

11. The method of claim 10 further including directly accessing the contents of the at least one address range at which target computer physical memory exists over an IEEE 1394-compliant serial bus.

12. The method of claim 10 wherein accessing from the host computer the contents of the at least one address range at which target computer physical memory exists comprises performing direct memory access without altering the contents of the target computer physical memory.

13. The method of claim 10 wherein directly accessing from the host computer the contents of the at least one address range at which target computer physical memory exists comprises accessing information sufficient for creating a simulated state of the target computer core operating system as the target computer core operating system existed immediately prior to accessing the target computer physical memory.

14. The method of claim 10 further comprising making the target computer physical memory appear to be linearly addressable by the host computer.

15. The method of claim 10 further comprising remotely issuing a command to the target computer core operating system to suspend execution of the target computer core operating system before obtaining handshake information from the target computer core operating system.

16. The method of claim 15 further comprising remotely issuing a command to the target computer core operating system to resume execution of the target computer core operating system after storing the contents of the at least one address range at which target computer physical memory exists to the storage device that is not local to the target computer.

17. A system for remotely creating a physical memory snapshot over a serial bus, the system comprising:
   a target computer including a physical memory and a core operating system stored at least in part in the physical memory;
   wherein the target computer is coupled to a host computer by an IEEE 1394-compliant serial bus;
   the core operating system providing handshake information including information specifying at least one address range for which the physical memory of the target computer is present;
   the host computer including a debugger for
      retrieving handshake information from the core operating system of the target computer,
      directly accessing the physical memory of the target computer based upon the handshake information, and
      storing a crash dump file containing the directly accessed physical memory of the target computer,
      wherein the host computer is configured to debug the core operating system of the target computer while the target computer core operating system is executing.

18. The system of claim 17 wherein data stored in the physical memory of the target computer includes information sufficient for creating a simulated state of the core operating system as the core operating system existed immediately prior to accessing the physical memory of the target computer.

19. A method of extracting and storing the contents of physical memory of a target computer, the method comprising:
   obtaining handshake information from a target computer core operating system, the handshake information specifying at least one address range at which target computer physical memory exists;
   directly accessing from a host computer the contents of the at least one address range at which target computer physical memory exists;
   storing the contents of the at least one address range at which target computer physical memory exists to a storage device that is not local to the target computer;
   remotely issuing a command to the target computer core operating system to suspend execution of the target computer core operating system before obtaining handshake information from the target computer core operating system;
   remotely issuing a command to the target computer core operating system to resume execution of the target computer core operating system after storing the contents of the at least one address range at which target computer physical memory exists to the storage device that is not local to the target computer;
   using the stored contents of the at least one address range at which physical memory exists to debug the target computer core operating system after remotely issuing a command to the target computer core operating system to resume execution such that the core operating system can be debugged in parallel with resumed execution of the target computer core operating system.

20. A computer-readable medium having computer-executable instructions for performing steps of:
   obtaining handshake information from a target computer core operating system, the handshake information specifying at least one address range at which target computer physical memory exists;
   directly accessing from a host computer the contents of the at least one address range at which target computer physical memory exists;
   storing the contents of the at least one address range at which target computer physical memory exists to a storage device that is not local to the target computer; and
   using the stored contents of the at least one address range at which target computer physical memory exists to debug the target computer core operating system while the target computer operating system is executing.

* * * * *